United States Patent [19]

McKay et al.

[11] 3,865,145

[45] Feb. 11, 1975

[54] PIPELINE SYSTEM

[75] Inventors: Alexander R. McKay; Daniel M. Masterson, both of Calgary, Alberta, Canada

[73] Assignee: Foundation Cryogenic Joint Venture, Vancouver, Canada

[22] Filed: May 10, 1973

[21] Appl. No.: 359,091

[52] U.S. Cl.................. 138/113, 138/149, 285/47, 285/114
[51] Int. Cl................................................ F16l 9/18
[58] Field of Search .......................... 138/147–149, 138/113, 108; 285/47, 138, 149, 114; 62/55

[56] References Cited
UNITED STATES PATENTS

| | | | |
|---|---|---|---|
| 2,964,064 | 12/1960 | Jones.............................. | 138/149 X |
| 3,275,345 | 9/1966 | Waldron et al.................. | 285/138 X |
| 3,430,484 | 3/1969 | Wittgenstein.................... | 138/148 X |
| 3,749,132 | 7/1973 | Prezewalski........................ | 138/148 |

FOREIGN PATENTS OR APPLICATIONS

| | | | |
|---|---|---|---|
| 487,135 | 10/1952 | Canada.............................. | 285/142 |

Primary Examiner—Jerry W. Myracle
Assistant Examiner—Daniel M. Yasich
Attorney, Agent, or Firm—Max Geldin

[57] ABSTRACT

A pipeline system, designed particularly for transporting liquid natural gas (LNG) is provided, comprising modular sections of insulated pipe, each modular section having an outer pipe and an inner pipe which is compressed and secured by means such as stress cones to the outer pipe, thermal insulation preferably being provided in the annular space between the inner and outer pipes. Such stress cones are provided at end portions of each modular section and function to transfer the compressive load from the inner pipe to a tension load on the outer pipe, thermal insulation also preferably being provided between the connection of each stress cone to the inner or outer pipe. When LNG is passed through the inner pipe at low temperatures, of the order of −258°F, contraction of the inner pipe which is under compression will be resisted by the physical connection to the outer pipe. The compression in the inner pipe is maintained by tension in the outer pipe, which can be at about ambient temperature, so that overall contraction of the system due to temperature decrease of the inner pipe is minimized.

27 Claims, 8 Drawing Figures

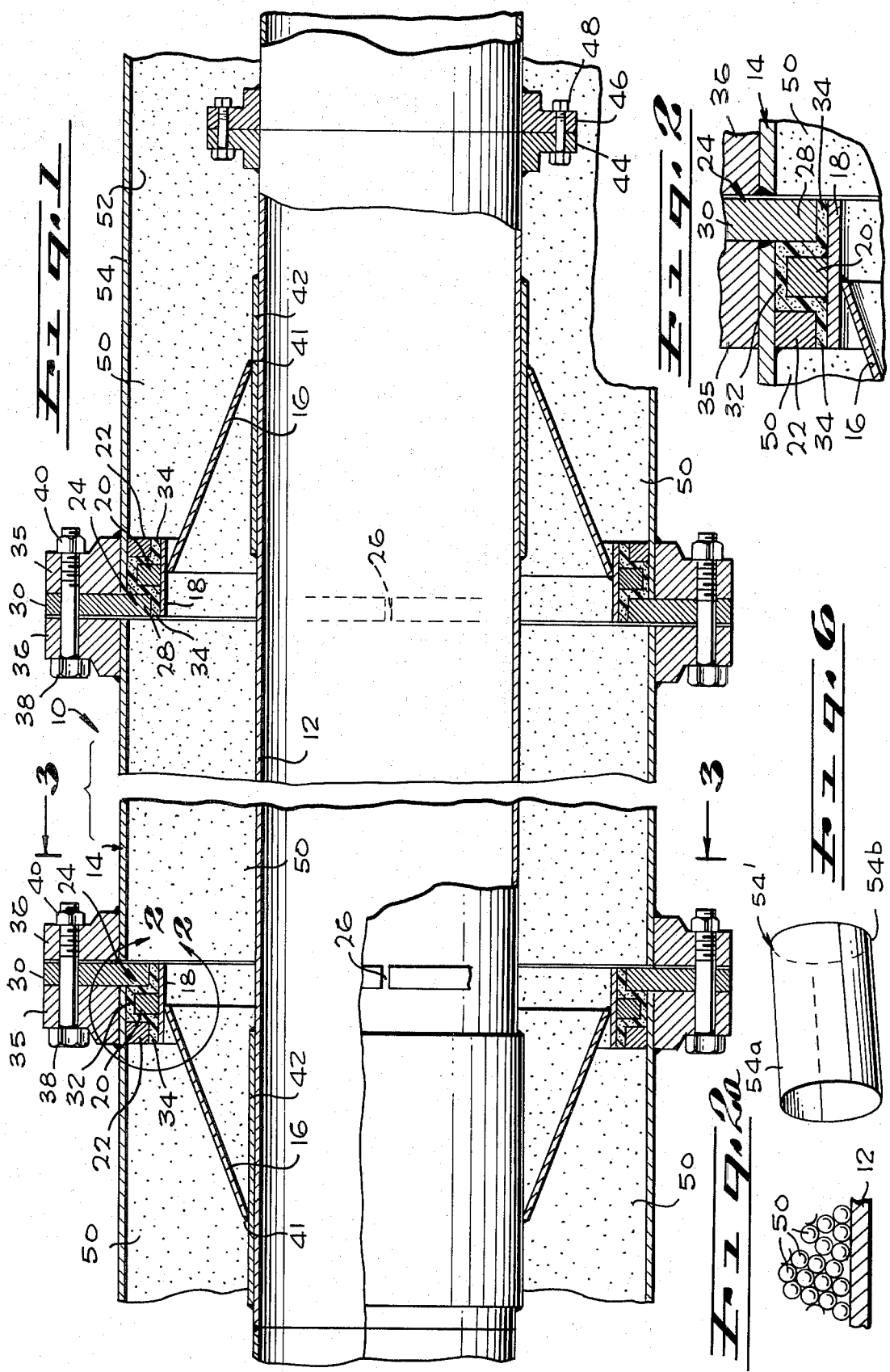

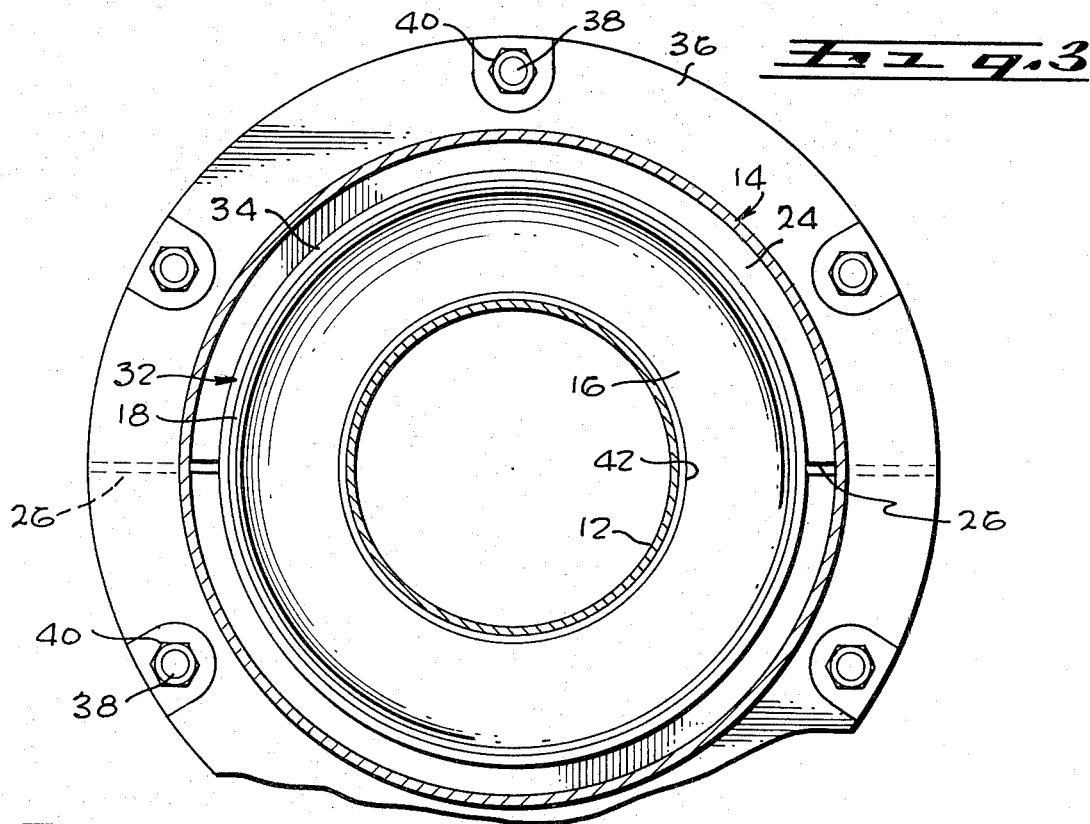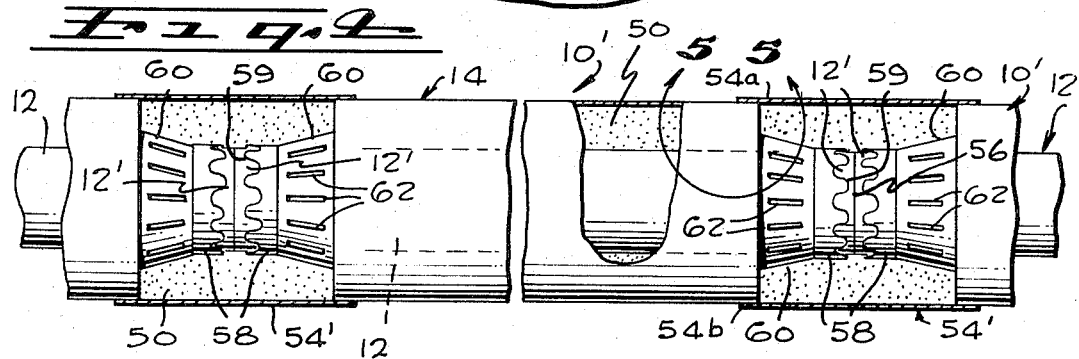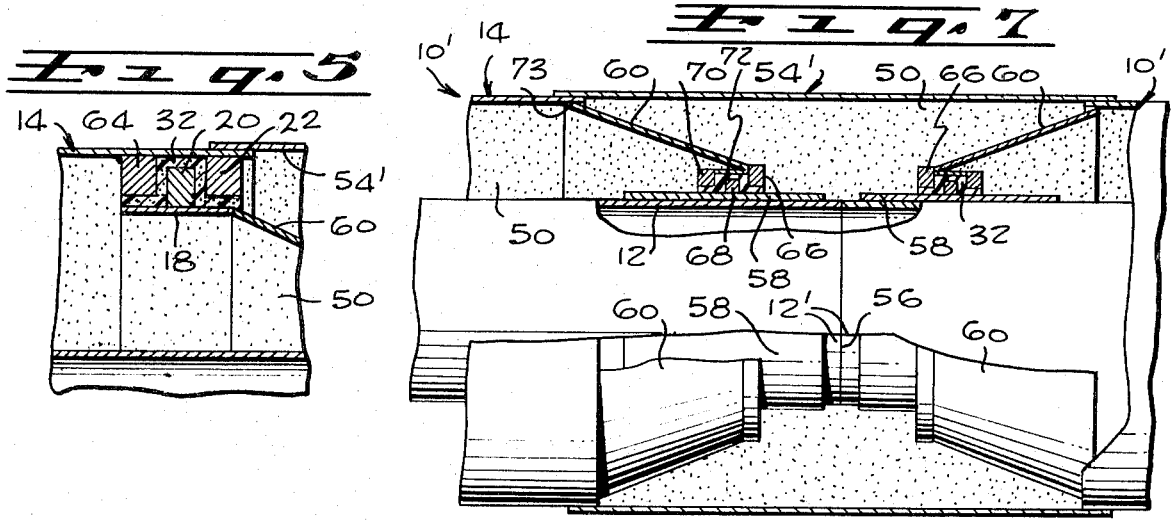

PIPELINE SYSTEM

BACKGROUND OF THE INVENTION

This invention relates to pipeline systems particularly designed for transporting very low temperature or cryogenic fluids, especially natural gas, usually essentially in liquid form and termed herein LNG, and is particularly concerned with the provision of a pipeline system of the above type, including means for minimizing overall contraction of the system during passage of LNG therethrough.

A particularly vexing problem generally faced in liquefied natural gas pipeline installations is the necessity for providing in such systems means to compensate for linear pipe expansion and contraction resulting from those periods when the pipe system is under substantially ambient temperature conditions, as when there is a cessation of LNG flow through the system, and when such system is subjected to very low or cryogenic temperatures of the order of about −258°F and lower, during passage of LNG through the line. Various cumbersome and expensive means have been employed heretofore to compensate for contraction of such an LNG pipeline system, such as the use of bellows or expansion joints at regular intervals along the line.

However, such prior art means for temperature compensation of the LNG line not only are expensive and cumbersome, but also present a potential leakage problem. The situation is compounded where, for example, temperature compensation is required for very long lengths of the order of thousands of feet of LNG pipeline.

DESCRIPTION OF THE INVENTION

The above disadvantages are overcome according to the invention by providing a pipeline system, particularly designed for transporting a very low temperature or cryogenic fluid, especially liquefied natural gas, comprising an inner pipe or shell for conveying the cryogenic liquid, and an outer pipe or shell spaced from the inner shell and positioned concentrically around the inner shell, and means associated with the inner and outer shells securing such shells in position with respect to each other and designed to minimize contraction of the overall system when the cryogenic liquid is being passed through the system.

More specifically, the cryogenic liquid, particularly LNG, pipeline according to the invention is comprised of modular sections, each such section comprising an inner pipe which is compressed and secured by means, preferably in the form of stress cones, to the outer pipe. The modular sections are connected together by suitable means to form a unitary pipeline system providing continuous fluid flow of LNG through the inner pipe of each modular section. The stress means, e.g., stress cones, perform a double function, namely they transfer the compressive loads from the inner pipe to a tension load on the outer pipe, and also provide thermal resistance to the flow of heat from one of such pipes to the other of such pipes, and more specifically from the outer ambient environment around the outer pipe to the cryogenic liquid or liquid natural gas contained within the inner pipe or shell.

Preferably, thermal insulation is added at either the connection of the stress cone to the outer shell or at its connection to the inner shell, to increase further the resistance presented by the respective stress means or stress cones to the flow of heat into the system.

Further resistance to the flow of heat into the system toward the inner pipe carrying the cryogenic liquid or LNG, can be provided by introducing thermal insulation in the annular space between the inner and outer pipes. Such thermal insulation is preferably of a type, as described in greater detail below, which also provides lateral support for the inner pipe when it is under compression and thereby aiding to prevent buckling thereof.

The compression in the inner pipe is maintained by the tension in the outer pipe, which can be at about ambient temperature, and the compression force is transmitted from the inner pipe to the outer pipe by the stress means or stress cones. When cryogenic liquid such as LNG is passed through the inner pipe, the tendency of such inner pipe to contract at such low operating temperatures will be balanced by the precompression in the inner pipe.

The overall contraction of the invention system when it drops in temperature from ambient to low operating temperature is a function of the coefficient of thermal expansion of both the inner and outer shells, the temperature range through which each shell or pipe operates, the diameter ratio of the two pipes or shells, and the thickness ratio of the respective shells. By proper combination of these parameters, the overall contraction due to temperature decrease of the system can be minimized.

The invention will be understood more readily by the detailed description below of certain preferred embodiments, taken in connection with the accompanying drawing wherein:

FIG. 1 is a sectional view of a portion of a temperature compensated pipeline system according to one embodiment of the invention;

FIG. 2 is a sectional detail taken at the location of line 2—2 in FIG. 1;

FIG. 2a is a detail showing an illustrative type of insulation employed in the system of FIG. 1;

FIG. 3 is a transverse section taken on line 3—3 of FIG. 1;

FIG. 4 is a view, shown partly broken away, of a modification of the system of the invention illustrated in FIG. 1;

FIG. 5 is a detail of the structure of FIG. 4, taken at the location of line 5—5 in FIG. 4;

FIG. 6 shows in perspective another structural detail of the pipeline system of FIG. 4; and FIG. 7 illustrates another modification of the pipeline systems shown in FIGS. 1 and 4, and wherein insulation is provided at the connection of the stress cones and the inner pipe.

Referring now particularly to FIGS. 1 to 3 of the drawing, the pipeline system of this embodiment is composed of a plurality of modular sections 10 comprising an inner pipe 12, an outer pipe 14 and a pair of stress cones 16 connecting the inner pipe 12 and the outer pipe 14, adjacent opposite end portions of each modular section 10.

In preferred practice for construction of a liquid natural gas pipeline system according to the invention, the outer pipe or shell 14 is formed of mild steels such as, for example, A.S.T.M. 36. However, although not preferred, such outer pipe or shell can be formed of suitably reinforced prestressed concrete. The inner pipe or shell 12 should have high strength characteristics at low temperatures, and is preferably composed of nickel steels, e.g. 3 percent, 5 percent or 9 percent nickel steels, and which also provides a low coefficient of thermal expansion.

The stress means in the form of the stress cones 16 constitute a particular feature of the invention and as previously noted, such stress cones serve to secure the inner pipe 12 to the outer pipe 14 and maintain such pipes in their concentric relation, and to transfer loads from one of the inner and outer pipes to the other, and specifically to transfer a compressive load from the inner pipe 12 to a tension load on the outer pipe 14. The stress cones 16 also provide a high resistant heat path from the outer pipe 14 to the inner pipe 12. This added thermal resistance of the stress cone is due to its length and configuration. Accordingly, the cones 16 preferably are composed of high strength materials having high modulus or stiffness, such as steels, e.g., the above-noted nickel steels for cryogenic service or other metals such as stainless steels for low temperature use.

If desired, holes or cut-out portions can be provided in the cones 16 to vary the thermal resistance thereof. Also, if desired, such cones can be in the form of an open web basket, or such cones can be replaced by a plurality of rods similarly connected between the inner pipe 12 and the outer pipe 14. Alternatively, a plurality of different stress means can be used, for example a combination of stress cones and rods.

The cones 16 are secured to the outer pipe 14 of each modular section 10 by connection at the outer end of each cone to a collar 18 as by welding, a ring 20 being positioned around the outer periphery of collar 18 centrally thereof, and suitably attached thereto as by welding. A ring 22 is disposed around the inner periphery of outer pipe 14 and attached thereto as by welding, such ring 22 being disposed adjacent one end portion of the collar 18, and another ring 24 is connected to outer pipe 14 as by welding, ring 24 being a split ring, as indicated at 26 and having an inwardly extending portion 28 and an outwardly extending portion 30. The inwardly extending portion 28 of split ring 24 is spaced from ring 22, and is disposed adjacent the other end portion of collar 18.

An insulator 32, which is essentially U-shaped, and having outwardly extending end portions 34, is disposed in a clearance space provided between the outer surfaces of collar 18 and its attached ring 20, and the adjacent inner surfaces of rings 22 and 24 attached to the outer pipe 14 and the inner surface of pipe 14 between rings 22 and 24. Such insulator 32 can be formed of any suitable insulating material having high compressive strength, such as Teflon (polytetrafluoroethylene) or any equivalent plastic insulating material having low thermal conductivity, and if desired, insulator 32 can be connected or otherwise suitably attached to the outer surfaces of collar 18 and ring 20. Thus, ring 20 and insulator 32 are held in position between rings 22 and 24 by a press fit. Such insulator 32 disposed between each of the stress cones 16 and their respective connections with the outer pipe 14, via the rings 22 and 24, further enhance the resistance to heat flow between outer pipe 14 and the inner pipe 12.

A pair of flanges 35 and 36 are connected as by welding around outer pipe 14 on opposite sides of and closely adjacent to the outer end portion 30 of the ring 24. Flanges 35 and 36 and the outer end portion 30 of ring 24 positioned between such flanges, are provided with suitably aligned holes, to receive a plurality of bolts 38 provided with nuts 40.

The stress cones 16 are connected as by welding at 41, to a sleeve 42 in turn attached or welded around the outer periphery of pipe 12. Adjacent mating sections of the inner pipe 12 of adjacent modular sections 10, are connected together by means of flanges 44 and 46 connected to adjacent ends of such pipe sections, and such flanges are connected together by the bolt and nut assemblies 48. The adjacent mating sections of pipe 12 also can be connected by other means such as welding.

When the bolts 38 for connecting the mating flanges 35 and 36 are tightened up, the inner pipe 12 is of such length with respect to the length of the outer pipe 14 between the rings 24, for each modular section, that such inner pipe will come under compression, and the transfer of the compressive load from the inner pipe 12 to the outer pipe 14 by the stress cones 16, will cause the outer pipe 14 to come under tension. In this respect, the two outer rings 22 welded to the outer pipe 14 adjacent opposite end portions of each modular section, constitute thrust rings, and the two inner rings 24 at opposite end portions of each modular section, constitute tension rings. It will be noted that the assembly including the mating flanges 35 and 36, bolts 38 and the split ring 24 permits complete removal of the inner pipe 12 and the stress cones 16 if desired.

Preferably, insulation indicated generally at 50 is provided in the annular space between inner pipe 12 and outer pipe 14. For this purpose, an insulation material is chosen which has low thermal conductivity and also has high compressive strength characteristics. Such insulation aids in providing continuous lateral support over the length of the inner pipe 12 when it is under compression loading, thereby preventing column buckling of the inner pipe. An example of a suitable type of insulation 50 is expanded cellular polystyrene, such as the material marketed as Styrofoam HD 1435, or as expanded polystyrene beads, as illustrated in FIG. 2a. However, other equivalent insulating materials such as closed cell high compressive strength polyurethane can be used.

Thus, it is seen that the inner and outer pipes 12 and 14, connected together by the cooperating stress cone assemblies 16 in a manner noted above, form a unitary pipeline system. As previously noted, by the tightening of the bolts 38, the inner pipe 12 is precompressed, and such compression loads are transmitted over the required circumferential length of the inner pipe section 12 of each modular section, such length being determined by the wall thickness of the inner pipe and its mechanical characteristics. Thus, the inner pipe 12 can be precompressed in the above manner to the extent that it will approach equilibrium stress at a minimum design temperature of about −250°F, the approximate operating temperature of the inner pipe 12 when liquid natural gas is flowing through it. It will be seen that the stress level at any operating temperature below ambient can be controlled by the amount of compression placed on the inner pipe during assembly. It will be understood that precompression of the inner pipe can be achieved by suitable means other than bolted flanges.

It will be noted that the insulation 50 is also disposed in the annular space 52 between the inner pipe 12 and that portion of outer pipe 14, indicated at 54, which is disposed between adjacent modular sections 10, as well as in the annular space between the inner and outer pipes of each modular section 10.

By a proper combination of the coefficient of thermal expansion of both the inner and outer pipes 12 and 14, the temperature range through which each pipe operates, the diameter ratio of the two pipes and the thickness ratio thereof, the overall contraction of the pipe system due to temperature decrease of the system can be minimized.

Referring now to FIG. 4, there is shown a modification of the pipeline system illustrated in FIGS. 1 to 3. In FIG. 4, adjacent ends of sections 12' of inner pipe 12 for each modular section 10' are provided with sleeves 58 around the outer peripheries of pipe sections 12', such sleeves being connected as by welding to such pipe sections and scalloped as indicated at 59 to provide added stiffness. The stress cones 60 which are connected to the inner and outer pipes 12 and 14, are similar to the stress cones 16 in FIG. 1, except that stress cones 60 are provided with slots or holes 62 to vary the thermal resistance of such stress cones. The stress cones 60 at opposite end portions of each modular section 10' are connected at their inner ends, as by welding, to the collars 58. The opposite outer ends of such stress cones are connected to the outer pipe 14 in a manner similar to that described above for the construction of FIG. 1, and incorporating the insulator 32 at the connection of stress cones 60 with the outer pipe 14, except that in the structure of FIG. 4, as seen more clearly by the detail in FIG. 5, a ring 64 is provided, welded to the inner periphery of outer pipe 14, in place of the outwardly extending split ring 24 in FIG. 1. Thus, as seen in FIG. 5, the components 18, 20 and 32 are locked within rings 22 and 64, thus connecting the stress cones 60 to the outer pipe 14. The sections of inner pipe 12' for each modular section 10' are precompressed, and such compression load is transferred by cones 60 to outer pipe 14 as a tension load. Adjacent ends of the sections 12' of adjacent modular sections then are welded together at their abutting ends, as indicated at 56.

Outer pipe sections or covers 54', illustrated further in FIG. 6, are provided between modular sections 14. Pipe sections 54' are similar to pipe sections 54 in FIG. 1, and can be in the form of mating half shells 54a and 54b for ease of assembly. Insulation 50 is disposed throughout the entire annular space between the inner pipe 12 and outer pipe 14, including the annular space between the adjacent end portions of inner pipe sections 12' and the adjacent outer pipe sections 54' between adjacent modular sections.

Theoretically, there is no load either compressive or tensile in the outer pipe sections 54' comprised of the half shells 54a and 54b, since there is no compression in the end sections 12' of inner pipe 12 between the stress cones 60 of adjacent modular sections 10'. The short length of such inner pipe sections 12' between the cones 60 will contract with drop in temperature. This contraction in turn will put a load in the opposite outer pipe sections 54'. The type of such loading, i.e., tension or compression, will depend upon the coefficient of expansion and the temperature change of the inner pipe sections 12', and also those values applicable to the outer sections or shells 54'.

Referring now to FIG. 7, there is illustrated a modification of the structure of the pipeline system of FIG. 4. In FIG. 7 the insulating member 32 is disposed at the connection between the stress cones 60 and the inner pipe 12. In this modification the inner end of each stress cone 60 is connected as by welding to an outer ring 66 disposed around the sleeve 58 which is connected to adjacent end portions of pipe sections 12', as in FIG. 4. A ring 68 is connected to the periphery of sleeve 58 adjacent to but spaced a short distance from ring 66, and a third ring 70 is provided around sleeve 58 and spaced a short distance from central ring 68. The substantially U-shaped insulator 32, similar to that employed in the constructions of FIGS. 1 and 4, is provided in the space between the central ring 68 and the adjacent rings 66 and 70, and a collar 72 is disposed opposite the peripheral surface of ring 68 and connected to rings 66 and 70. The outer end of the stress cone 60 is connected at 73 as by welding, to the interior surface of the outer pipe 14 at the ends of each modular section 10'.

If desired, to provide even greater thermal insulation between the stress cones and the inner and outer pipes, an insulator such as 32 can be provided at the connection of the stress cones with both the inner and outer pipes.

From the foregoing, it is seen that the invention provides a relatively simple and economical means for temperature compensation of cryogenic pipeline systems, particularly designed for transport of liquid natural gas, which substantially minimizes the effects of contraction of the pipe system conveying such low temperature liquids, the system being designed to avoid any buckling or failure of the line due either to contraction or expansion. The system of the invention permits the use of lower cost steels for the inner pipe employed to convey the cryogenic liquid, and although the pipeline system of the invention has been described and shown for use with straight pipes, it will be understood that the system is also applicable for use with bent or irregularly aligned pipelines.

The pipeline construction of the invention is particularly adapted for use of modular prestressed pipe sections such that normal pipeline welding techniques for welding together adjacent modular sections can be employed directly for either barge laying or dragging from shore.

The pipeline system of the invention can be designed for placement under water, e.g., in lakes, rivers and the ocean, and under normal soil or permafrost.

While we have described particular embodiments of the invention for purposes of illustration, it will be understood that various changes and modifications can be made therein within the spirit of the invention, and the invention accordingly is not to be taken as limited except by the scope of the appended claims.

We claim:

1. A pipeline system having reduced contraction when subjected to low temperatures, comprising a first inner pipe means, a second outer pipe means disposed concentrically about said inner pipe means, and providing an annular space between said inner pipe means and said outer pipe means, a plurality of stress means disposed in said annular space, each said stress means being connected at one end portion to said inner pipe means and at the other end portion to said outer pipe means, said stress means securing said inner pipe means to said outer pipe means, and arranged to transfer a compressive load from one of said pipe means to a tension load on said other pipe means, said stress means also formed to provide thermal resistance to the flow of heat from one of said pipe means to the other of said pipe means, and thermal insulation means selectively positioned at at least one of the connections of each of said stress means between said inner and outer pipe means.

2. A pipeline system having reduced contraction when subjected to low temperatures, comprising a first inner pipe means, a second outer pipe means disposed concentrically about said inner pipe means, and providing an annular space between said inner pipe means and said outer pipe means, a plurality of stress means disposed in said annular space, each said stress means being connected at one end portion to said inner pipe means and at the other end portion to said outer pipe means, and arranged to secure said inner pipe means to said outer pipe means, and to transfer a compressive load from one of said pipe means to a tension load on said other pipe means, said stress means also providing thermal resistance to the flow of heat from one of said pipe means to the other of said pipe means, and thermal insulation means connected to said stress means between the inner and outer pipe means to increase further the resistance to flow of heat presented by said stress means, from one of said pipe means to the other of said pipe means.

3. A pipeline system as defined in claim 2, said inner pipe means being compressed, and said stress means transferring said compressive load from said inner pipe means to a tension load in said outer pipe means.

4. A pipeline system as defined in claim 2, said stress means being a stress cone.

5. A pipeline system as defined in claim 4, said thermal insulation means being disposed at the connection of said stress cones with said outer pipe means, said inner pipe means being compressed, and said stress cones transferring said compressive load from said inner pipe means to a tension load in said outer pipe means.

6. A pipeline system as defined in claim 4, said thermal insulation means being disposed at the connection of said stress cones with said inner pipe means, said inner pipe means being compressed, and said stress cones transferring said compressive load from said inner pipe means to a tension load in said outer pipe means.

7. A pipeline system as defined in claim 2, including a second thermal insulation means in said annular space between said inner and outer pipe means.

8. A pipeline system having reduced contraction when subjected to low temperatures, comprising a plurality of modular sections connected together to form said pipeline system, each said modular section including a first inner pipe for passage of a cryogenic liquid therethrough, said inner pipe formed of a metal having high strength characteristics at low temperature, and providing a low coefficient of thermal expansion, a second outer pipe positioned concentrically around said inner pipe, and providing an annular space between said inner pipe and said outer pipe, a pair of stress cones positioned in said annular space adjacent opposite end portions of each said modular section, said stress cones being composed of a high strength material having high modulus, a first means connecting one end of each said stress cones to said inner pipe and a second means connecting the other end of each said stress cones to said outer pipe, said stress cones securing said inner pipe to said outer pipe, and arranged to transfer a compressive load to a tension load from one pipe to the other, and providing a high resistant heat path from said outer pipe to said inner pipe, and a thermal insulator member positioned between an end of said stress cones and at least one of said inner and outer pipes, said insulator member formed of an insulating material having high compressive strength, and a second thermal insulation positioned in said annular space between said inner and outer pipes, said second thermal insulation having low thermal conductivity and high compressive strength.

9. A pipeline system having reduced contraction when subjected to low temperatures, comprising a plurality of modular sections connected together to form said pipeline system, each said modular section including a first metal inner pipe, a second metal outer pipe positioned concentrically around said inner pipe, and providing an annular space between said inner pipe and said outer pipe, a pair of metal stress cones positioned in said annular space adjacent opposite end portions of each said modular section, a first means connecting one end of each said stress cones to said inner pipe and a second means connecting the other end of each said stress cones to said outer pipe, said stress cones securing said inner pipe to said outer pipe and arranged to transfer a compressive load to a tension load from one pipe to the other, a thermal insulator member positioned between an end of said stress cones and at least one of said inner and outer pipes, and additional means connecting said inner and outer pipes of each modular section to the inner and outer pipes, respectively, of an adjacent modular section.

10. A pipeline system as defined in claim 9, said inner pipe being compressed, and said stress cones transferring said compressive load from said inner pipe to a tension load in said outer pipe, said stress cones having high strength and stiffness, and providing high thermal resistance to the flow of heat from one of said inner and outer pipes to the other said pipe.

11. A pipeline system as defined in claim 10, said stress cones formed of nickel steels or stainless steels.

12. A pipeline system as defined in claim 10, including a second thermal insulation positioned in said annular space between said inner and outer pipes, said second thermal insulation having low thermal conductivity and high compressive strength.

13. A pipeline system as defined in claim 12, said thermal insulator member being composed of polytetrafluoroethylene and said second thermal insulation being in the form of expanded cellular polystyrene or closed cell polyurethane.

14. A pipeline system as defined in claim 12, said thermal insulator member being positioned between said other end of said stress cones and said outer pipe.

15. A pipeline system as defined in claim 12, said thermal insulator member being positioned between said one end of each of said stress cones and said inner pipe.

16. A pipeline system as defined in claim 9, said additional connecting means including outer pipe sections positioned between and connected to said outer pipes of adjacent modular sections.

17. A pipeline system as defined in claim 9, said second connecting means including ring means mounted on said outer pipe and extending into said annular space, and a collar, said collar being connected to said other end of each of said stress cones, said thermal insulator member being disposed between and in contact with said ring means and said collar.

18. A pipeline system as defined in claim 17, said first connecting means including a sleeve mounted on the exterior of said inner pipe adjacent said one end of each of said stress cones, said one end of each of said stress cones being connected to said sleeve.

19. A pipeline system as defined in claim 9, said first connecting means including ring means mounted on the exterior of said inner pipe and extending into said annular space, said thermal insulator member being disposed between said ring means and said one end of each of said stress cones.

20. A pipeline system as defined in claim 19, said one end of each of said stress cones being connected to said ring means.

21. A pipeline system as defined in claim 9, including a second thermal insulation positioned in said annular space between said inner and outer pipes, said second thermal insulation having low thermal conductivity and high compressive strength.

22. A pipeline system as defined in claim 9, said thermal insulator member positioned between each end of said stress cones and said inner and outer pipes.

23. A pipeline system as defined in claim 9, said thermal insulator member having high compressive strength.

24. A pipeline system having reduced contraction when subjected to low temperatures, comprising a plurality of modular sections connected together to form said pipeline system, each said modular section including a first metal inner pipe, a second metal outer pipe positioned concentrically around said inner pipe, and providing an annular space between said inner pipe and said outer pipe, a pair of metal stress cones positioned in said annular space adjacent opposite end portions of each said modular section, a first means connecting one end of each said stress cones to said inner pipe and a second means connecting the other end of each said stress cones to said outer pipe, said stress cones securing said inner pipe to said outer pipe, said first connecting means including a sleeve mounted on the exterior of said inner pipe adjacent said one end of each of said stress cones, said one end of each of said stress cones being connected to said sleeve, said second connecting means including ring means mounted on said outer pipe and extending into said annular space, and a collar, said collar being connected to said other end of each of said stress cones, a thermal insulator member disposed between and in contact with said ring means and said collar, said inner pipe being compressed, and said stress cones transferring said compressive load from said inner pipe to a tension load in said outer pipe, said stress cones having high strength and stiffness and providing high thermal resistance to the flow of heat from one of said inner and outer pipes to the other of said pipes, and additional means connecting said inner and outer pipes of each modular section to the inner and outer pipes, respectively, of an adjacent modular section, said additional connecting means including outer pipe sections positioned between and connected to said outer pipes of adjacent modular sections, and a second thermal insulation positioned in said annular space between said inner and outer pipes, and between said inner pipe and said outer pipe sections disposed between adjacent modular sections, said second thermal insulation having low thermal conductivity and high compressive strength.

25. A pipeline system as defined in claim 24, said ring means including a first thrust ring and a second split tension ring disposed adjacent said thrust ring, flanges mounted exteriorly on said outer pipe adjacent said first and second rings, a third ring mounted exteriorly on said collar, said thermal insulator member being U-shaped and positioned between said first and second rings, and between said collar and third ring, bolt means for tightening said flanges and causing said compressive load on said inner pipe which is transmitted by said stress cones to produce a balancing tension load in said outer pipe.

26. A pipeline system as defined in claim 24, said ring means including a first ring and a second ring, said rings mounted around the inner periphery of said outer pipe and spaced axially from each other, a third ring mounted exteriorly on said collar, said thermal insulator member being U-shaped and positioned between said first and second rings, and between said collar and third ring.

27. A pipeline system as defined in claim 26, wherein said inner pipe is precompressed.

* * * * *